Aug. 28, 1928. 1,682,722
J. BIJUR
COUPLING AND THE LIKE
Filed Jan. 23, 1922
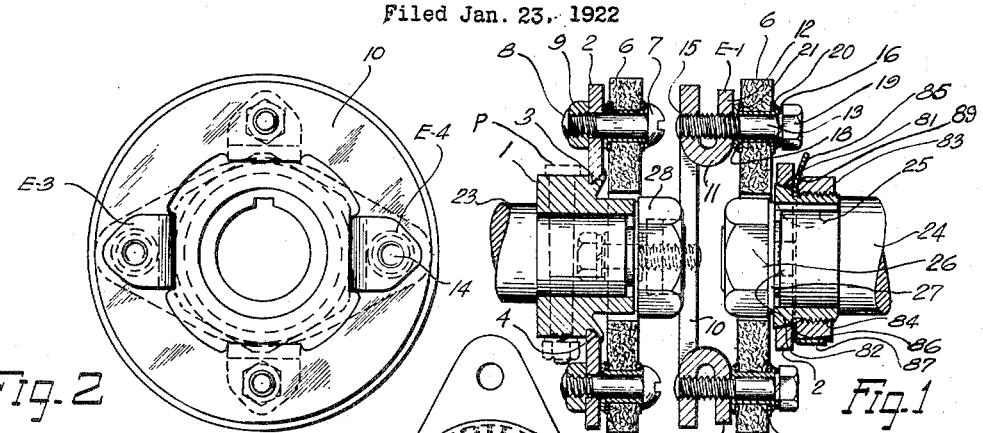
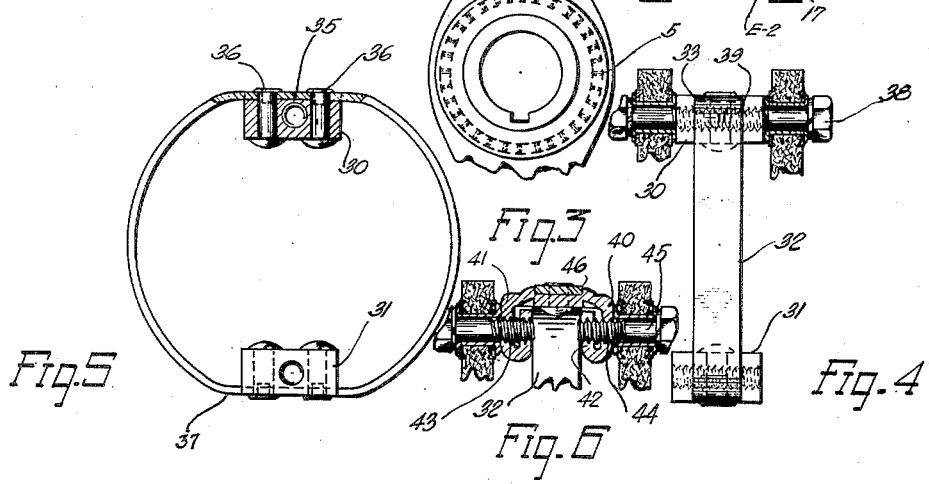
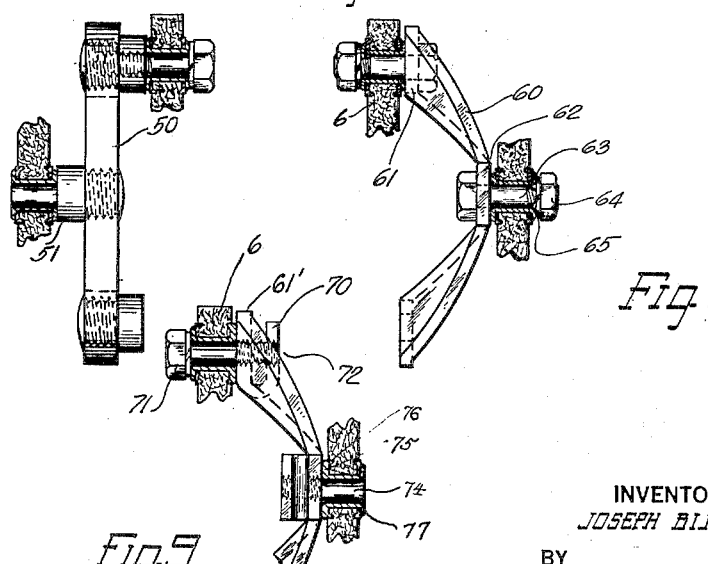
INVENTOR
JOSEPH BIJUR
BY
Deen, Fairbank, Obright & Hirsch.
ATTORNEY Patented Aug. 28, 1928.

1,682,722

UNITED STATES PATENT OFFICE.

JOSEPH BIJUR, OF NEW YORK, N. Y.

COUPLING AND THE LIKE.

Application filed January 23, 1922. Serial No. 531,009.

My present invention relates to mechanical couplings for driving one shaft element from another and with regard to its more specific applications to couplings of the type by which the need for precision in the alignment of the shafts is eliminated. The invention has application broadly for transmitting torque from a power or driving element to an adjacent driven machine or shaft. The embodiment disclosed, although of broad utility is particularly applicable to automotive vehicles, as, for instance, in transmitting torque between the engine and accessory machines, such as magnetos, generators and water pumps, also between the engine and the transmission, and at opposite ends of the propeller shafts of such vehicles.

The invention in its preferred application is concerned with the type of coupling structure in which each hub is connected to or carries a separate and distinct yieldable member extending about the axis of the coupling, the two yieldable elements being in turn drivingly connected by a more rigid transmission member, although certain important features of the invention are more broadly applicable to other structural types of couplings.

It is an object of the invention to provide a simple, reliable and durable coupling, which shall transmit the torque even between poorly aligned shafts with a minimum of wear upon the associated shaft bearings.

Another object is to provide a practical coupling of the above type of short length useful in relations where economy of length is desirable or required and where the distance between adjacent shaft ends is correspondingly small, and which coupling shall yet lend itself readily to connection between shaft ends separated by a greater interval.

Another object is to provide a coupling in which the connecting elements for holding the constituent coupling parts in assembled relation firmly retain their hold without the likelihood of wear or loosening even under severe conditions of use, so that the yield in the coupling shall be confined to the elements intended to yield, avoiding rattling and eliminating a cause of lag and lead of the shafts with respect to each other.

Another object is to provide a coupling of the above type, the connecting parts of which shall be simple and easily accessible for facility in mounting into operative position, and removal, or dismounting and without the use of specialized tools or the exercise of dexterity.

Another object is to provide a coupling of the above type in which the flexible parts shall be easily and quickly removable for replacement, without the exercise of skill or the use of specialized tools.

Another object is to provide a coupling of the above type in which the fastening means for holding the flexible element in position shall be so differentiated from those holding the hub units to the transmission element, as to avoid the possibility of confusion when a coupling is to be removed from the shaft or when a flexible element is to be replaced.

Another object is to provide a coupling of the above type which will permit of easy access to the shaft securing elements from the exterior of the assembled and installed device.

Another object is to provide a coupling of the above type, the parts of which shall not interfere with the vertical movement up or down of the coupled machine, such as a magneto, in removal or installation.

Other objects will be in part obvious and in part pointed out hereinafter.

The above and other features of my invention may be more fully understood from the accompanying drawings in which are shown one or more of various possible embodiments of the several features of the invention.

Fig. 1 is a view in transverse section of a preferred form of coupling shown applied, Fig. 2 is a plan of a hub unit viewed from the interior, Fig. 3 is a fragmentary view on a smaller scale showing the flange construction, Fig. 4 is a fragmentary side elevation of a coupling, showing a modified form of transmission piece, Fig. 5 is a plan view, partly in section of the transmission piece of the embodiment shown in Fig. 4, and;

Figs. 6, 7, 8 and 9 are fragmentary views of further modifications of couplings.

Referring now to Figs. 1 and 3 of the drawings, there is represented a coupling comprising a pair of hubs 1 of familiar form, each provided with a flange 2 extending outwardly therefrom along one diameter, the said flange being preferably a stamping having a central opening 3 passed over the hub, the hub upset as at 4 into scallops 5 at the edge of the flange opening to rigidly secure the parts together. Thus, by a simple operation, the flange is fastened to the hub both against removal and against relative rotation, the upset rim performing the first function, and the hub metal pressed into the scallops, the second.

The coupling includes a pair of identical rings 6, preferably composed of rubber and canvass, having an outer diameter somewhat larger than that of the flange and a substantial width for strength, the inner periphery in the embodiment shown, being of a diameter little larger than that of the hub. Each of the flexible rings is secured at diametrically opposite points to the corresponding flange 2 near the outer ends thereof by means of a bolt 7 which extends through the ring and the flange and is upset as at 8 to prevent loosening or loss of the associated nut 9 which is located at the outer surface of the flange. To provide a firm, non-tearing connection between the bolt and the flexible member, I prefer to employ the construction shown which will be described more fully below.

Two hub units of the character described, each comprising a hub with a flange having a flexible ring bolted thereto are connected by an intermediate transmission piece. The transmission piece in the embodiment shown in Figs. 1 and 2 comprises a stamped metal annulus 10 of a thickness materially less than the distance between the two flexible rings, said annulus being flat and having an inner diameter materially larger than that of the shaft securing nuts, as shown, and an outer diameter preferably little less or equal to that of rings 6. The transmission stamping has integral ears E projecting preferably from the inner periphery thereof spaced at equal angular intervals and extending alternately toward opposite sides of the ring, as shown. Each of the ears has a root or base 11 extending outwardly from the main portion of the annulus and an end 12 extending radially outwardly preferably parallel to the plane of the ring and in the cylindrical volume determined by the inner and outer peripheries of the ring as a base. As shown in the drawings, there are thus a pair of diametrically opposite ears E' and E² adjacent one of the rings 6 and a second pair of diametrically opposite ears E³ and E⁴ adjacent the other ring 6. Each of these ears is secured to the associated ring preferably midway between the bolts 7, the longer axes of flanges 2 of the two hub units being thus at right angles to each other, as shown. Preferably identical clamping means are provided for attaching each of the ears to the adjacent ring 6 and one of these will now be described. A cap screw 13 extends transversely through a ring 6 and is threaded into a tapped opening 14 in the ear E, and also into an aligned tapped opening 15 in the main portion of the ring. To further secure the screw so that it shall not become loose or lost as the result of wear or vibration, a lock washer 16 is used. Since the efficacy of a lock washer depends largely on clamping between two unyielding surfaces, and since ring 6 is yielding, means is associated with said ring in the vicinity of the lock washer to provide the desired unyielding reaction surface. This means preferably comprises an eyelet or rivet 17 extending transversely through the ring, to take the thrust of the screw, one end 18 of the rivet being thereby pressed against ear E and the other end against lock washer 16, which is interposed therebetween and the head 19 of the screw. The rivet thus affords an incompressible tube between which and the bolt head the lock washer is operatively disposed. To firmly and permanently anchor the eyelet in the ring 6, cupped metallic washers 20 and 21 are provided at the opposite ends, and are held and pressed inwardly by the rolled over ends of the eyelet, to cause the edges of the washers to dig into the flexible material of the ring. Although it is preferred to snugly fit the eyelet in a corresponding aperture in the ring, this is not essential since the cupped washer 20 and 21 will firmly hold the eyelet even should there be clearance. Tearing of holes in the rings in installation or operation is avoided, since the strain on the ring material will be distributed over a substantial area being taken partly by the eyelet and partly by the edges of the two cupped washers.

In the fastening construction described, in which a long bearing is provided by bending up an ear from the transmitting piece and holding the screw 13 at both ends but not at the middle by said piece and its ear, it is found that the screw is held with substantially the same security against shaking, as if the threaded hole extended continuously from the transmitting piece to the ear. Thus a firm hold is provided for clamping the lock washer 16 against the eyelet end 17, and the lock washer, in turn, prevents any rotation or loosening of the screw. If only a short threaded bearing were provided for the screw, as, for instance, a single thickness of the stamping 10, there might not be sufficient security for the screw thereat, to retain it against advance under vibration and consequent disengagement of the lock washer. Thus, I have provided a secure fastening means of the screw variety, between a flexible element and a metal stamping of relatively small thickness, and this fastening means, it will be understood is applicable in other relations.

Preferably an arrangement of eyelets and cupped washers identical with that described is used for coaction with the bolts and nuts 7—8—9 heretofore described, by which the flanges 2 are secured to the rings. Each flexible ring is thus provided with four equidistant terminals, each made up of an eyelet and a pair of associated dished washers, the terminals being permanent parts of the ring, not likely to be lost or omitted in assembly. In driving, the strain on the flexible rings is distributed not only through the tubular parts or bushings of the eyelets, but also through the peripheral flanges of the dished washers 20 and 21. Thus, by means of the rivet and dished washers, the driving strain is distributed over a substantial area at each of the points of attachment to the flexible rings and the latter are, therefore, effectively protected against wear and tear.

Starting with a completely assembled coupling, the same is mounted to transmit torque between a pair of shaft ends 23 and 24 by merely removing a pair of the screws 13 connecting one of the flexible rings 6 to the transmission unit. The other hub 1 with the ring 6 and the transmission piece 10 mounted thereon, is then slipped over the shaft 23 and is keyed thereto as by a Woodruff key 25, whereupon the usual nut 26 is threaded upon the extreme end of the shaft and tightened by means of a wrench and secured by a lock washer 27. It will be seen that the nut is readily accessible either to a socket or an S wrench, since the transmission piece has a sufficiently larger inner diameter for access and operation of the former and is sufficiently spaced laterally from ring 6 for access and operation of the latter. The other hub having been similarly applied to the other shaft and secured thereto by tightening the nut 28, one of the shafts is moved toward the other until the unconnected ears E' and E² mounted on one of the hubs are brought into alignment with the eyelets 17 on the other hub, whereupon the screws 13 each carrying a lock washer 16 are passed through the eyelets and threaded into the tapped apertures 15 in the ears and in the main circumference of the transmission piece.

Thus my construction is readily connected operatively in the usual approved practical manner, by means of nuts upon the shafts pressed against the hubs and located between the ends of the coupling and this without the need for separating the transmission element from both hubs, which would occur where the transmission element has too small a diameter or too great a length for convenient access of a wrench. After attachment of a hub unit to one of the shafts and of the other hub unit with the transmission element thereon to the other shaft, only two screws need be tightened for securing the hub unit to the transmission element to complete the application.

After installation, it will be seen that ample room is left between the flexible rings and the transmission unit construction for access of a screw driver or other tool by which either nut 26 or nut 28 may be tightened or loosened by simply tapping with a hammer from the exterior without the need for disassembly or reassembly of the construction.

Obviously, the transmission piece might be formed with a larger or with a smaller space between the main portion of the ring and the terminal ears than shown, for forming a longer or shorter coupling respectively.

As shown in the drawings, the hubs 1 extend outwardly beyond the flanges for convenience in the use of an alternative shaft connection, shown in dotted lines in Fig. 1. For this purpose, the hub and shaft would be perforated to accommodate the pin P extending transversely therethrough. Obviously, substantially the entire length of hub beyond the flange could be dispensed with if the coupling is to be used only with a nut or equivalent fastening for the shafts applied between the flanges.

It will be seen that the flexible ring quadrants extend freely between the points of attachment to the flange and the points of attachment to the transmission piece, and, as heretofore noted, the portions of the rings overlapping the flanges 2 are spaced therefrom by the eyelet ends and are spaced by a material distance from the transmission member. Thus, although the coupling is short in length, there is ample space allowed for flexure of the ring quadrants. The coupling has material flexibility in an axial direction for increase or decrease of effective length to permit of application to shaft ends spaced by a distance other than that corresponding to the length of the coupling. In this relation, the hubs are simply drawn away from or toward each other, the rings 6 readily flexing for this purpose.

In application if the two shafts to be connected are mounted with ordinary care, then, as is well known the alignment is ordinarily inaccurate. The shafts may extend with respect to each other at an angle somewhat less than 180 degrees or while extending at an angle of 180 degrees they may be displaced from each other laterally by a gap sometimes of almost $\frac{1}{16}$ of an inch, or there may be both angular and lateral displacement, the shafts extending in slightly different planes. The coupling flexes readily for application between shafts related to each other in any of the above ways, and in operation, it will consequently exert little or no lateral pressure or wear on the shaft bearings.

In the rapid rotation of the coupling, whether applied between shafts misaligned laterally, angularly, or both, each quadrant will pass through a cycle of flexure to compensate for the misalignment. There being ample space between the transmission member and the inner surfaces of the rings and between the rings and the hub flanges, no interference will occur as a result of this flexure.

The transmission member stamping it will be seen although inexpensive, light and simple, has substantial stiffness in the driving direction and will, therefore, prevent rotary advance of either flexible ring with respect to the other. It will also be seen that each of the loop elements formed of an ear and the adjacent portion of the main annular transmission member has substantial stiffness to oppose any tendency to twist it laterally, and thus affords a firm and effective engagement for the screws 13. It will further be seen that the transmission piece has small mass and is well-balanced, and will, therefore, set up little centrifugal force, and no appreciable vibration will, therefore, result from its rotation out of center between poorly aligned shafts.

Disconnection or removal of the coupling from the shafts is readily effected by the use of a screw driver and wrench, the operation heretofore described in connection with the mounting being simply reversed. It will be seen that the two screws 13 associated with each ring are readily accessible from the exterior of the ring and readily removable, to separate a hub unit from the transmission piece, while there is no possibility of removal of the hub from the ring since the latter elements are connected by the upset bolts.

When it is desired to remove a flexible ring, as for replacement, it is merely necessary to file off the upset ends 8 of the two corresponding bolts 7 whereupon a new ring can be substituted together with a new pair of bolts, the ends of which in turn will be upset over the nuts.

Thus, the device can be readily applied and readily removed by the use of an ordinary screw driver and a wrench, and there is no danger of removing the rings from the hubs where the mere removal of the coupling from the shafts is to be effected, while the flexible rings may readily be removed for replacement by the use of a file.

In the embodiment shown in Figs. 4 and 5 the transmission piece comprises a pair of preferably rectangular bridging blocks 30, 31 of substantial width and of lesser thickness, preferably cut from rectangular steel stock. The bridging blocks normally extend parallel to the coupling axis and serve as direct connections between the rings 6 at points midway between the ends of the flanges. The bridging blocks are connected together by a metal band 32 substantially narrower than the length of the bridges, generally circular in form of diameter somewhat smaller than the outer diameter of the rings and fitting snugly in corresponding grooves 33 and 34 in the outer surfaces of the bridge blocks and midway between the ends thereof. The free ends of the band preferably abut as at 35 between the ends of the groove 33 in one of the blocks and are positively secured in place by rivets 36. Preferably the generally circular band 32 is flattened as at 37, at the parts fitting upon the bridging blocks for snug surface engagement with the grooves, to prevent shift of the band with respect to the parallel bridging pieces. The band is obviously very stiff in an edgewise direction, so that it will not buckle to allow the bridges to move out of parallelism.

The transmission unit consisting of the bridging blocks 30 and 31 and the connecting band 32 is preferably associated with the two hub units in a manner which will be apparent from the drawings. The hub units which are preferably identical in every respect with those shown in Figs. 1 and 2, are disposed with the lengths of flanges 2 extending along the same axial plane of the coupling, and in parallel relation, as best shown in Fig. 3. The transmission unit is interposed between the two rings with the bridging blocks midway between the flange ends or spaced by 90 degrees from the bolts 7 which connect the rings to the flanges. The connection between each of the rings and the transmission element is preferably effected by cap screws 38 threaded into corresponding tapped openings 39 in the bridging pieces, and are, of course, firmly retained by the aid of lock washers substantially as in the previously described embodiment. It will be apparent that for different lengths of coupling, it is merely necessary to sever corresponding lengths of bridging pieces from the metal stock.

As the embodiment previously described, the coupling of Figs. 4 and 5 has material flexibility in an axial direction for increase or decrease of effective length, to permit of application to shaft ends spaced by a distance other than that corresponding to the coupling length. If the lengthening is appreciable, however, the radially inward stress upon the flexible rings at the points of attachment to the bridges may cause the latter to approach each other somewhat against the resistance of band 32, the latter yielding or flattening somewhat.

In Fig. 6 is shown a construction of bridge element alternative to that shown in Figs. 4 and 5. This bridge element consists of a metal stamping of U-shape, as shown, in which the legs 40 and 41 are reversely bent as at 42, preferably inwardly to afford a double thickness of metal, preferably tapped as at 43 and 44 for accommodating the screws as at 45 by which the bridging piece can be secured with respect to the yielding rings. Preferably the metal stamping has a depression 46 in the center of the outer surface thereof in which the band 32 fits closely and by which it is held against lateral deflection or cocking relative to the bridging piece.

In Fig. 7 is shown a construction embodying an alternative form of transmission element, comprising a relatively thick forged metal ring 50 having secured thereto separate terminal blocks 51 corresponding roughly to the ears E in Fig. 1, having shanks preferably threaded into the ring, the terminal blocks being at equal angular intervals of a quadrant alternately on opposite surfaces of the ring.

In Fig. 8 is shown another alternative form in which the center piece or transmission element comprises a single generally annular stamped metal piece 60 having terminal portions 61 of short length at diametrically opposite points deflected laterally of the central or median plane thereof, indicated in dot and dash lines and having similar portions 62 at the ends of a diameter at right angles to the first diameter deflected similarly toward the opposite side of the median plane, the amount of deflection being such that the terminal surfaces 61 and 62 are in planes spaced from each other by a distance substantially that required between the flexible rings 6. Since the single thickness of stamped metal employed may not be sufficient to afford a reliable threaded engagement with a screw, such, for instance, as employed in the embodiment shown in Figs. 1 to 7, it is preferable in this embodiment to employ a nut and bolt fastening means. As shown in Fig. 8, the head of the bolt 63 preferably extends between the rings and engages the terminal portions 61 or 62 of the transmission piece, while the nut 64 is threaded at the exterior, a lock washer 65 being preferably interposed, the eyelet taking the thrust of the nut in a way readily understood from the showing and description of Fig. 1.

In Fig. 9 I have shown a further alternative embodiment combining features shown in the embodiment of Figs. 1 and 8. A transmission piece generally identical with that shown in Fig. 8, corresponding parts identified by the same reference characters primed, is provided with integral upstanding ears 70, the latter similar to those shown in Fig. 1. In this embodiment the terminal portions 61′ on the main area of the ring rather than the ears are pressed against the rivet heads, and cap screws 71 rather than bolts are employed for purposes of attachment, the free ends 72 of the screws extending into the ears. In this embodiment, it will be noted that the space between each ear and the associated terminal portion may be varied without change of the coupling length.

In Fig. 9, I have shown a standard leather and canvass eyelet, which may be used if desired instead of the form shown in Figs. 1 to 8 and heretofore described. In Fig. 9 it will be noted that the eyelet 74 has an integral dished head 75, the edge 76 of which digs into the material of the flexible ring, the other end 77 of the eyelet being rolled over a washer similar to washer 21 heretofore described.

Although many variations are possible in the construction of the flexible rings and their eyelet terminals also in the hub and flange constructions, and also in the means for connecting the ring to the hub to form the hub unit, I prefer in all the embodiments shown to employ the specific hub units shown fully in Fig. 1.

It is manifest that where desired, instead of providing attachment at only four points, as shown, for each flexible ring, two for the associated hub and two for the transmission piece, attachment may be provided at three or more points with each of these elements.

Obviously, many of the details in the various embodiments set forth, and especially the flexible ring unit construction, the hub unit construction and the threaded attachment construction, are broadly applicable to couplings of the type embodying a single flexible ring member connected at spaced intervals directly to two hubs, or equivalent elements.

Since the coupling in all embodiments shown operates substantially without lag or lead of the driven shaft with respect to the driving shaft, it is suitable for driving magnetos. To effect proper timing adjustment of the magnetos so that the spark will take place in correct phase with the engine rotation, one of the hubs is preferably arranged to be adjustable, as shown in Fig. 1. For this purpose the flange 2 is provided with a beveled opening 81 fitting over a beveled or conical flange 82 at the end of the hub and held in frictional driving relation therewith by a nut 83 threaded upon the hub as at 84, and exerting pressure upon the adjacent side of the flange 2. It will be seen that the clutch element 81 is formed in a stamped member, and is of correspondingly small thickness. However, by providing a steep angle, in the neighborhood of 12 degrees or less with respect to the axis, a sufficiently firm hold is provided for all practical purposes, although the clutch surfaces are left smooth.

A locking plate 85 is interposed between the flange and the nut, preferably a simple stamping having tongues, one of which is shown at 86 bent to extend into a corresponding slot 86 in flange 2, the remaining tongues 87 projecting beyond the sides of nut 83, to facilitate the insertion of a screw-driver or equivalent tool between the flange 2 and any of the tongues, to aid in bending the latter over the sides of the nut. The edge of the nut 83 is preferably rounded as at 89 to afford a large radius of curvatures for the ears, thereby preventing the likelihood of cracking off of an ear that might result from a sharp or abrupt bend.

To effect shaft adjustment, it is obvious that the nut 83 need merely be loosened, the locking tongue 87 being, of course, first bent outwardly and the hub with its key can be rotated through the desired angle with respect to the flange 2 and the nut then again tightened to frictionally connect the parts and the same or other locking tongues 86, 87 bent over to re-establish the locking hold. The adjustment means is a simple construction involving only a conical fit between the hub and the flange, and a simple nut and locking plate for tightening the connection.

Automotive accessory machines, and particularly magnetos are frequently retained against sliding along the supporting bed by the use of short dowel pins projecting downwardly thereinto. Where my coupling is used with such machines, the removal is particularly easy, for the reason that, after taking out the two screws 13 holding a flange to the transmission piece, the machine can be raised vertically sufficiently to remove the dowels from the base, the flexible ring moving upwardly along the bridging pieces without any obstruction whatsoever. Where instead of screws, bolts and nuts are employed to secure the transmission member to the co-operating coupling part, it is apparent that it would, in general, be necessary not only to remove the nuts but also to withdraw the bolts to render possible a lifting of the magneto or other machine with dowels, so that more separate parts would have to be handled and greater inconvenience in disassembly and reassembly would be entailed.

I claim:—

1. In a coupling, in combination, a pair of hub members, flexible driving members connected to said hub members at spaced points substantially equidistant from the axis of the coupling and transmission means connected to said flexible members at spaced points on radii of the coupling intermediate said first connections, the transmission means presenting a central opening for convenient access through said transmission means of a wrench for the purpose of tightening a nut for securing one of the hubs upon a shaft while the transmission means remains in place upon said hub.

2. The coupling as recited in claim 1 in which the connections between the transmission element and the flexible driving members are conveniently severable and in which the connections between the hub members and the flexible driving members are severable with less convenience by substantial destruction of the connector.

3. In a coupling, in combination, a pair of hub members, flexible driving members secured one to each hub member, a generally circular transmission member of thickness materially less than the distance between the two flexible members, and inner diameter sufficiently large for convenient access of a wrench to tighten a fastening nut, said transmission member having parts extending laterally thereof toward said driving members and secured thereto at points intermediate the points of connection of the latter to the hub members.

4. In a coupling, in combination, a pair of hub members, flexible driving members corresponding one to each hub member and secured thereto at equi-distant points, a transmission member between said flexible members of a thickness materially less than the distance between the two flexible members, said driving and transmission members being open in the region of the coupling axis for convenient access of a wrench to tighten coupling fastening nuts, said transmission member having parts at equal angular intervals extending alternately toward one and the other flexible member, and securing means fastening said parts to said flexible members at points midway between the points of connection of the latter to the hub members.

5. In a flexible coupling, in combination, a pair of hub members, flexible members corresponding one to each hub member and secured thereto at equidistant points, a transmission member between said flexible members and comprising a single integral stamping said flexible and said transmission members each affording a substantial space about the coupling axis for access of a wrench to tighten coupling fastening nuts, said stamping having terminal parts extending some toward one and some toward the other flexible member, and securing means fastening said terminals to said flexible members at points intermediate the points of connection of the latter to the hub members.

6. In a flexible coupling, in combination, a pair of hubs, flexible rings attached to said hubs each near the opposite ends of a ring diameter, a transmission member comprising an integral annular metal stamping, said rings and transmission member having a substantial inner diameter to afford sufficient space for access of a wrench, to tighten coupling fastening nuts, said stamping having two diametrically opposite integral parts bent laterally of the general plane of the stamping toward one side thereof, means securing said parts to one of said disks at points midway between the points of attachment of said disk to the corresponding hub, said stamping having similar parts along a diameter at right angles to said first diameter and extending in the opposite direction, and secured to the other flexible disk at points midway between the points of attachment of the latter to its hub.

7. In a flexible coupling, in combination, a pair of hubs, flexible rings secured to said hubs each near diametrically opposite ends of a ring diameter, a transmission member interposed between said rings, said transmission member comprising a single generally annular metal stamping, said stamping having integral ears, the bases of which extend outwardly from the general body of the annular stamping and the free ends of which extend parallel to said stamping, and securing means for firmly attaching said ears to said rings at points substantially midway between the points of attachment of the rings to the hubs.

8. In a flexible coupling, in combination, a pair of hubs, a pair of flexible rings carried thereby, a transmission piece interposed between said rings, said transmission piece comprising a flat ring of thickness materially less than the distance between said flexible rings and integral ears on said rings, extending laterally thereof, some adjacent one of said flexible rings and some adjacent the other, and securing means for fastening each of said ears to the adjacent part of the adjacent ring.

9. In a flexible coupling, in combination, a pair of hubs, a pair of flexible rings carried thereby, a transmission piece comprising a flat, annular metal stamping of thickness materially less than the distance between said two rings and extending midway between said rings, integral ears on said transmission piece extending laterally thereof and at equal angular intervals, alternatively toward the opposite sides, and threaded means for securing each of said ears with respect to the adjacent part of the adjacent ring, said threaded means extending transversely through the ring, the ear and the main body of the transmission piece.

10. In a flexible coupling, in combination, a pair of hubs, a pair of flexible rings secured thereto, a transmission member interposed between said rings, said member comprising a stamped metal ring of thickness materially less than the distance between said flexible rings, said ring having integral ears extending laterally thereof and parallel to said flexible rings, some in contact with one of said rings and some in contact with the other, and driving connections between said flexible rings and said transmission piece, each of said driving connections comprising a screw extending through the ring, and threaded into one of the ears and the adjacent part of the main body of the ring, a lock washer under the head of said screw, and rigid reaction means for said lock washer extending transversely of said flexible ring.

11. The combination set forth in claim 10 in which the rigid reaction means comprises an eyelet extending transversely through said flexible ring to encircle the screw, and washers at opposite surfaces of said flexible ring are held in place by the ends of said eyelet.

12. In a flexible coupling, in combination, a pair of hubs, a pair of flexible rings connected thereto, and a transmission piece extending between said rings and generally coaxial therewith, said piece having terminal parts deflected out of the general plane thereof, to extend in planes parallel thereto, some adjacent one of said rings and the rest adjacent the other of said rings, said securing means comprising bolts and nuts, each extending through one of said parts and through the adjacent portion of the flexible ring.

13. In a flexible coupling, in combination, a pair of hubs, a pair of flexible rings carried thereby, a stamped metal transmission piece of thickness materially less than the distance between said flexible rings, said transmission piece having diametrically opposite terminal portions deflected laterally of the general plane thereof for attachment to one of said rings and having similar portions at a diameter at right angles to said first diameter deflected laterally in the opposite direction for attachment to the other ring, and securing means for effecting clamping connections between said terminal portions and said rings, each said securing means comprising a bolt extending through one of the terminal portions of the transmission piece and through an aperture in said ring, a nut threaded upon the end of said bolt at the exterior of said ring, a lock washer for said nut, and reaction means for rendering said lock washer effective, said reaction means including an eyelet through said flexible ring and encircling said bolt.

14. As an article of manufacture, a transmission piece for a coupling comprising a stamped metal ring having integral terminal portions deflected toward opposite sides thereof and extending in the cylindrical volume determined by the outer and inner peripheries of said ring as a base, and an aperture in each said terminal portion for accommodating a clamping member to secure the transmission piece to the associated coupling parts.

15. As an article of manufacture, a transmission piece for a flexible coupling comprising a stamped metal ring, ears formed integral with the inner periphery thereof, successive ears extending alternately toward opposite sides of said ring, the free end of each said ear extending radially outwardly parallel to and at a distance from the adjacent portion of the ring, each of said ears and the adjacent portion of the ring being tapped for accommodation of a threaded clamping member by which the ring may be secured to an adjacent coupling element.

16. As an article of manufacture, a transmission piece for a flexible coupling comprising a flat sheet metal stamping, integral terminal ears extending at intervals of a quadrant from the inner periphery thereof, successive ears being bent outwardly alternately from opposite sides of said ring to extend parallel thereto and at a distance therefrom, each of said ears being tapped in alignment with a corresponding tap in the adjacent portion of the main body of the ring.

17. In a flexible coupling, means for securing a flexible ring member into torque transmitting relation, said means comprising a clamp means, frictionally gripping opposite faces of the flexible element, a rivet extending through the ring member and gripping the clamp means, and a threaded member extending transversely through said clamp means and said rivet and into an adjacent part of the coupling for clamping all of said parts together.

18. In a flexible coupling, in combination, a ring of rubber and canvass composition or the like, means for securing said ring to a more rigid coupling member, said means comprising clamping washers at opposite sides of said ring, a rivet member extending transversely of said ring and through said washers, a screw extending through said rivet and threaded into said more rigid coupling element, and a lock washer between the head of said screw and said rivet member.

19. In a flexible coupling, in combination, a pair of hubs, flexible rings of rubber composition or the like secured thereto, a transmissioned member interposed between said rings and including relatively rigid metal parts, and means securing each of said rings to said transmission member, said fastening means being of the construction set forth in claim 18.

20. In a coupling, in combination, a flexible, non-metallic torque transmitting element of compressible material, a second torque transmitting member comprising an integral metallic stamping, and means for transmitting torque from said first to said second member, said means comprising a screw extending transversely through said flexible member and threaded into said metallic stamping, said metallic member having an integral ear extending into the path of said screw and into which said screw is threaded to afford added security therefor, a metallic thrust receiving member extending between said metallic transmitting member and the head of said screw, and a lock washer between said thrust receiving member and said head.

21. In a flexible coupling, in combination, a ring of rubber composition or the like, mechanical terminals carried by said ring, each of said terminals including a pair of cupped washers at opposite sides of said ring and a rivet extending transversely through the ring and the washers and forcing the edges of said washers into said ring.

22. In a flexible coupling, in combination, a pair of substantially identical hub elements, each provided with a flexible ring member and a transmission element interposed between and connected to said flexible members at points intermediate the points of connection of the flexible rings to the hubs, metallic members frictionally gripping the flexible members extending one at each point of connection, screws having their heads at the external sides of the flexible members for securing the latter to the transmission member, and bolts having nuts at the exterior face of the flexible member for securing the latter to the hubs, said bolts being upset.

23. In a coupling of the type comprising a pair of hubs, a pair of flexible members connected thereto and an intermediate transmission member, and connecting means between said flexible rings and said transmission member; the construction in which each said connecting means comprises a metallic member firmly secured to said flexible element and a screw extending transversely through said metallic element and threaded into said transmission member, the head of said screw being freely accessible from the exterior of the device.

24. In a flexible coupling, in combination, a flexible non-metallic ring of substantial thickness, a hub having a flange, rivet members extending transversely of said flexible ring and having rims of substantial thickness for contacting said flange and thereby spacing the ring from the flange at all other points, and transverse members for clamping said rivets against said flange.

25. In a magneto coupling, in combination, a hub, a flat stamped metal flange adjustable with respect thereto, said hub having a conical part fitting into a corresponding beveled opening in said flange to form a metal clutch, a member associated with said hub, and means for tightening said clutch with said hub in any angular relation.

26. In a magneto coupling, in combination, a stamped metal flange, a hub having a clutch element comprising an integral conical flaring end, fitting into a corresponding beveled opening in said flange to form a metal clutch, nut threaded upon said hub to tighten said slutch by pressure against said flange, the gripping surfaces of said clutch being smooth and forming an angle in the neighborhood of 12 degrees with respect to the axis thereof.

27. In a magneto coupling, in combination, a hub, a flange adjustable with respect thereto, a nut associated with said hub for pressing said flange into direct frictional engagement with said hub in any relation, and a locking plate interposed between said nut and said flange, said plate having ears to be bent over the edge of said nut to provide a locking connection, said nut having a rounded edge, whereby a large bending radius is provided for the ears of the locking plate, thereby avoiding cracking off of the ears.

28. A hub unit for couplings comprising a hub member, a flange encircling the same, said hub having a rim upset against said flange, to prevent removal of said flange from the side of said rim, said rim having integral projections fitting into corresponding depressions in said flange to prevent relative rotation thereof.

29. In a flexible coupling, in combination, a hub unit adapted to be secured to a shaft, a coacting coupling element including a second hub for securing to another shaft, and mechanical connecting means between said first hub unit and said coupling element, said connecting means being displaceable for dismounting to allow limited movement of said hub element with respect to said coupling element in a direction at right angles to the axis of the coupling, for convenience in disconnection of a coupled machine held by dowel pins upon a support.

30. In combination, a pair of shaft ends, hubs thereon, nuts threaded on the ends of said hubs and securing them in position, flexible rings carried by said hubs and spaced apart a distance greater than that between said nuts, a transmission member drivingly connecting said rings, said transmission member having portions for clamping coaction with each of said rings and affording free space for insertion of a tool therethrough, such as a screw-driver, to render possible tightening or loosening of a shaft-securing nut from the exterior of the assembled and installed device.

31. The combination of a flexible disk for a universal joint having a series of bolt holes therein; a washer at each side of the disk at each bolt hole; and a bushing in each bolt hole extending through the washers and flanged over the washers.

32. In a flexible coupling, in combination, a flexible non-metallic ring of substantial thickness, a hub having a flange, rivet members extending transversely of said flexible ring and having rims of substantial thickness for contacting said flange and thereby spacing the ring from the flange at all other points, transverse members for clamping said rivets against said flange, and metallic plate elements against opposite surfaces of said flexible rings traversed by said rivets to prevent tearing of said rings.

33. In a flexible coupling, in combination, a pair of hubs provided with outstanding flanges, rings of rubber composition secured to said flanges at diametrically opposite points, a transmission member interposed between said rings and secured thereto at diametrically opposite points midway between said points of connection to said flanges; each of said securing means including a pair of metal plates against opposite sides of the ring, a rivet extending transversely through the ring and serving to secure said plates in position, said rivet having a head, and a threaded fastening element extending transversely through the rivet and clamping said head against the element to which it secures the ring.

Signed at New York, in the county of New York and state of New York, this 21st day of January A. D. 1922.

JOSEPH BIJUR.